(12) United States Patent
Grisenthwaite et al.

(10) Patent No.: US 11,636,048 B2
(45) Date of Patent: Apr. 25, 2023

(54) HANDLING GUARD TAG LOSS

(71) Applicant: Arm Limited, Cambridge (GB)

(72) Inventors: Richard Roy Grisenthwaite, Cambridge (GB); Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 43 days.

(21) Appl. No.: 17/259,785

(22) PCT Filed: Jun. 7, 2019

(86) PCT No.: PCT/GB2019/051590
§ 371 (c)(1),
(2) Date: Jan. 12, 2021

(87) PCT Pub. No.: WO2020/025918
PCT Pub. Date: Feb. 6, 2020

(65) Prior Publication Data
US 2021/0224203 A1 Jul. 22, 2021

(30) Foreign Application Priority Data

Jul. 31, 2018 (GB) ...................................... 1812486

(51) Int. Cl.
*G06F 12/14* (2006.01)
*G06F 11/07* (2006.01)
(Continued)

(52) U.S. Cl.
CPC ........ *G06F 12/1441* (2013.01); *G06F 11/073* (2013.01); *G06F 11/141* (2013.01);
(Continued)

(58) Field of Classification Search
CPC ............... G06F 11/073; G06F 12/1466; G06F 12/1441; G06F 11/0793; G06F 11/141;
(Continued)

(56) References Cited

U.S. PATENT DOCUMENTS

| 5,163,096 | A | 11/1992 | Clark et al. |
| 10,949,292 | B1* | 3/2021 | Mathewson ........ G06F 11/1016 |

(Continued)

FOREIGN PATENT DOCUMENTS

| EP | 0 823 685 | 2/1998 |
| GB | 2541714 | 3/2017 |

(Continued)

OTHER PUBLICATIONS

Bernhard, Lukas • Rodler, Michael • Holz, Thorsten • Davi, Lucas, "xTag: Mitigating Use-After-Free Vulnerabilities via Software-Based Pointer Tagging on Intel x86-64", arXiv.org, Mar. 8, 2022.*

(Continued)

*Primary Examiner* — Pierre Michel Bataille
(74) *Attorney, Agent, or Firm* — Nixon & Vanderhye P.C.

(57) ABSTRACT

An apparatus comprising memory access circuitry to perform a tag-guarded memory access in response to a received target address and methods of operation of the same are disclosed. In the tag-guarded memory access a guard-tag retrieval operation seeks to retrieve a guard tag stored in association with a block of one or more memory locations comprising an addressed location identified by the received target address, and a guard-tag check operation compares an address tag associated with the received target address with the guard tag retrieved by the guard-tag retrieval operation. When the guard-tag retrieval operation is unsuccessful in retrieving the guard tag, a substitute guard tag value is stored as the guard tag in association with the block of one or more memory locations comprising the addressed location identified by the target address.

19 Claims, 11 Drawing Sheets

(51) Int. Cl.
 *G06F 11/14* (2006.01)
 *G06F 12/1027* (2016.01)
(52) U.S. Cl.
 CPC ...... *G06F 12/1027* (2013.01); *G06F 12/1466* (2013.01); *G06F 12/1491* (2013.01); *G06F 2212/1052* (2013.01)
(58) Field of Classification Search
 CPC ............. G06F 12/1491; G06F 12/1027; G06F 2212/1052; G06F 2212/1004
 See application file for complete search history.

(56) References Cited

U.S. PATENT DOCUMENTS

| | | | |
|---|---|---|---|
| 2007/0005895 | A1 | 1/2007 | Fujisaki et al. |
| 2008/0195813 | A1* | 8/2008 | Fleiner ................ G06F 11/2089 711/E12.001 |
| 2009/0327619 | A1* | 12/2009 | Cantin ................ G06F 12/0862 711/E12.001 |
| 2015/0248357 | A1* | 9/2015 | Kaplan ................... G06F 21/53 713/193 |
| 2017/0139717 | A1* | 5/2017 | Hornung ............... G06F 9/3806 |

FOREIGN PATENT DOCUMENTS

| | | |
|---|---|---|
| TW | 200634531 | 10/2006 |
| TW | 201516680 | 5/2015 |

OTHER PUBLICATIONS

P. Petrov, D. Tracy and A. Orailoglu, "Energy-efficient physically tagged caches for embedded processors with virtual memory," Proceedings. 42nd Design Automation Conference, 2005., 2005, pp. 17-22.*
International Search Report and Written Opinion of the ISA for PCT/GB2019/051590, dated Sep. 20, 2019, 16 pages.
Search Report for GB181248637, dated Feb. 15, 2019, 4 pages.
Watson et al., "Capability Hardware Enhances RISC Instructions: CHERI Instruction-Set Architecture (Version 6)" University of Cambridge, Technical Report No. 907, Apr. 30, 2017, XP055578241, 307 pages.
Song et al., "HDFI Hardware-Assisted Data-Flow Isolation", 2016 IEEE Symposium on Security and Privacy, May 22, 2016, pp. 1-17, XP032945689.
Serebryany et al., "Memory Tagging and How it Improves C/C++ Memory Safety", ARXIV.org, Feb. 26, 2018, XP081212932, 14 pages.
Gumpertz, "Error Detection with Memory Tags", Carnegie Mellon University, Dissertations, Dec. 1981, Paper 533, 119 pages.
Bedichek, "Some Efficient Architecture Simulation Techniques," Proceedings of the Winter 1990 USENIX Conference, Jan. 22-26, 1990, 12 pages.
Office Action for IN Application No. 202117002688 dated Nov. 15, 2022, 6 pages.
Office Action for TW Application No. 108123707 dated Sep. 29, 2022, 5 pages.
Office Action for EP Application No. 19730517.0 dated Feb. 9, 2023, 9 pages.

* cited by examiner

HANDLING GUARD TAG LOSS

This application is the U.S. national phase of International Application No. PCT/GB2019/051590 filed 7 Jun. 2019, which designated the U.S. and claims priority to GB Patent Application No. 1812486.7 filed 31 Jul. 2018, the entire contents of each of which are hereby incorporated by reference.

The present techniques relate to the field of data processing.

A data processing system may use techniques to protect against certain usage errors by the provision of guard tags which are stored in a memory system in association with blocks of one or more memory locations. When an access to the memory system is made an address tag associated with the memory access may be compared against a guard tag retrieved from the memory system and memory usage errors may be identified by a mismatch between the two. Conversely a match between the two can indicate that the memory, and in particular the relevant memory locations, are being used correctly.

At least some examples provide an apparatus comprising: memory access circuitry to perform a tag-guarded memory access in response to a received target address, the tag-guarded memory access comprising: a guard-tag retrieval operation to retrieve a guard tag stored in association with a block of one or more memory locations comprising an addressed location identified by the received target address; and a guard-tag check operation of comparing an address tag associated with the received target address with the guard tag retrieved by the guard-tag retrieval operation, wherein the memory access circuitry is responsive to the guard-tag retrieval operation being unsuccessful in retrieving the guard tag to cause storage of a substitute guard tag value as the guard tag stored in association with the block of one or more memory locations comprising the addressed location identified by the target address.

At least some examples provide a method comprising: performing a tag-guarded memory access in response to a received target address, the tag-guarded memory access comprising the steps of: retrieving a guard tag stored in association with a block of one or more memory locations comprising an addressed location identified by the received target address; and comparing an address tag associated with the received target address with the guard tag retrieved in the retrieving step, and, when the retrieving step is unsuccessful in retrieving the guard tag, causing storage of a substitute guard tag value as the guard tag stored in association with the block of one or more memory locations comprising the addressed location identified by the target address.

At least some examples provide a computer program for controlling a host data processing apparatus to provide an instruction execution environment for execution of instructions of target program code, comprising: memory access logic to perform a tag-guarded memory access in response to a received target address, the tag-guarded memory access comprising: a guard-tag retrieval operation to retrieve a guard tag stored in association with a block of one or more memory locations comprising an addressed location identified by the received target address; and a guard-tag check operation of comparing an address tag associated with the received target address with the guard tag retrieved by the guard-tag retrieval operation, wherein the memory access logic is responsive to the guard-tag retrieval operation being unsuccessful in retrieving the guard tag to cause storage of a substitute guard tag value as the guard tag stored in association with the block of one or more memory locations comprising the addressed location identified by the target address.

A storage medium may store the computer program described above. The storage medium may be a non-transitory storage medium.

The present techniques will be described further, by way of example only, with reference to embodiments thereof as illustrated in the accompanying drawings, to be read in conjunction with the following description, in which:

FIG. 1 schematically illustrates an example of a data processing apparatus;

Figure 4A:
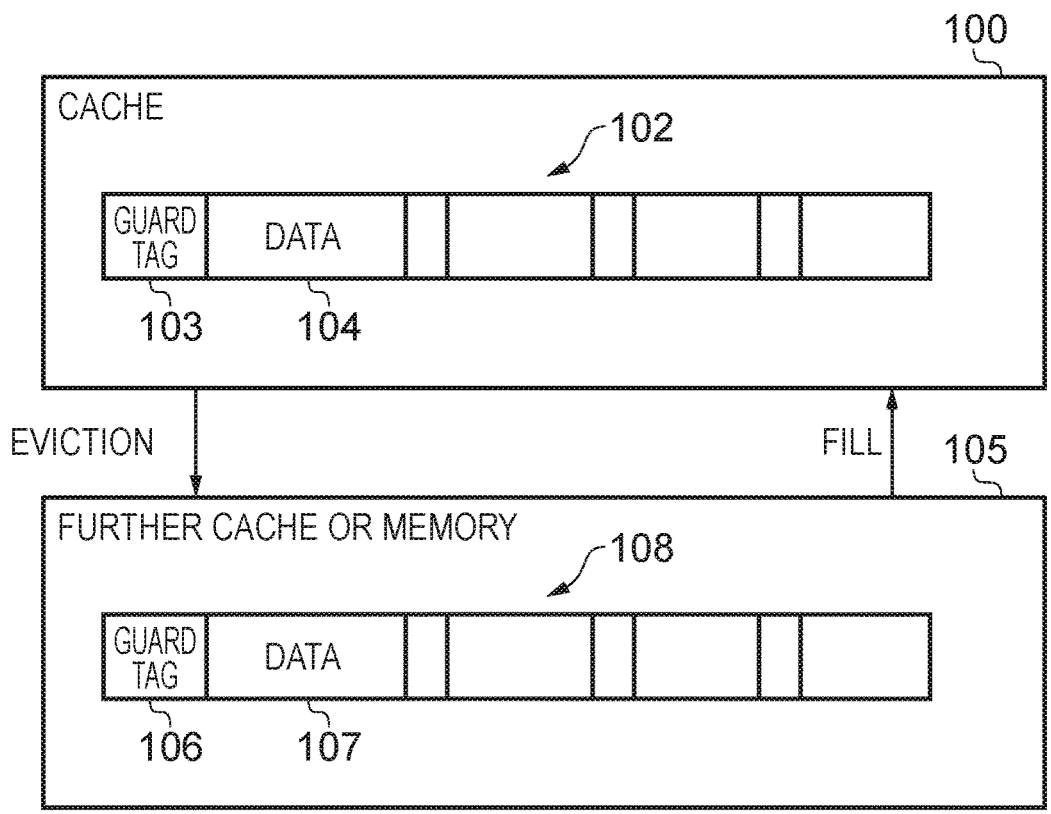
Figure 4B:
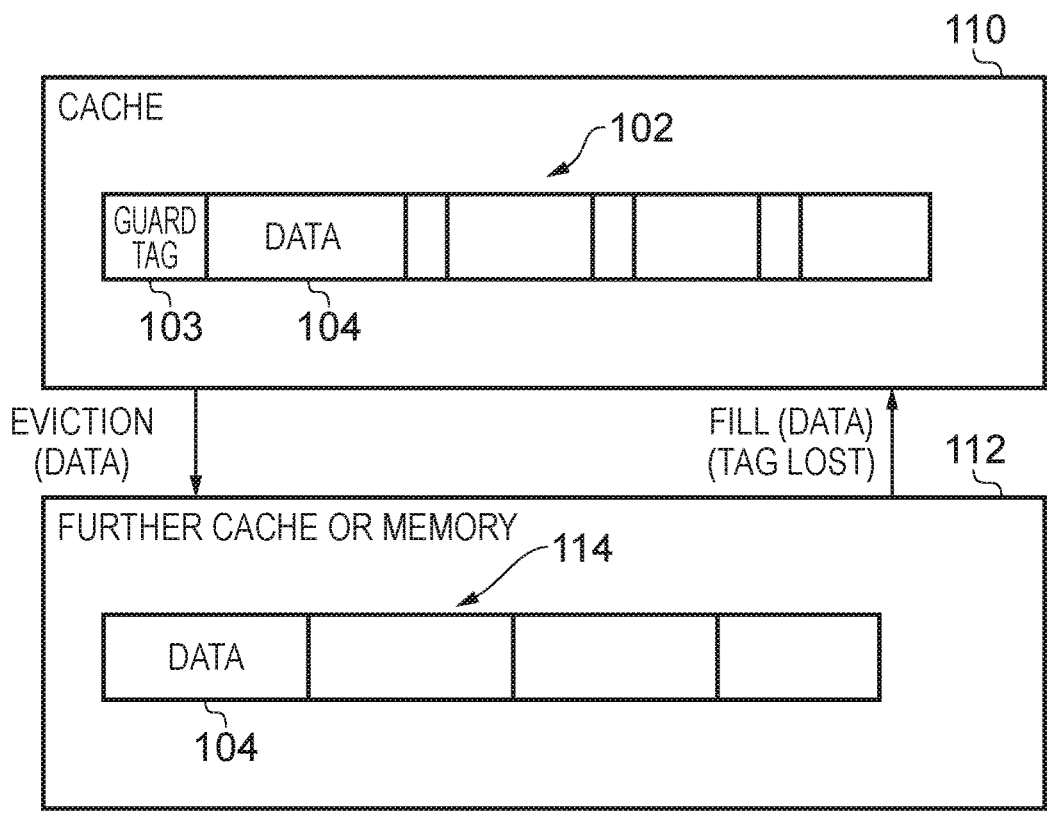
Figure 5:
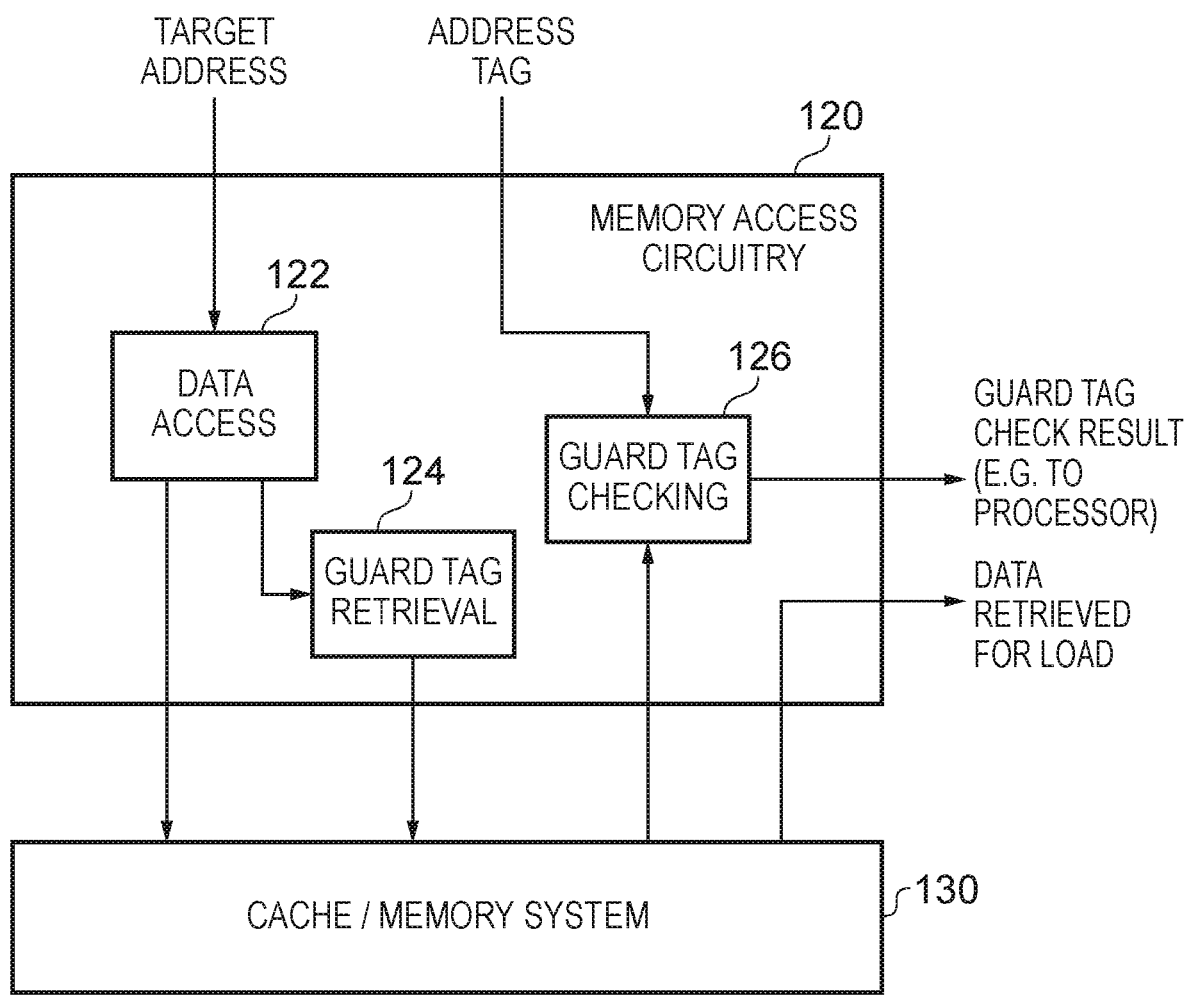
Figure 6A:
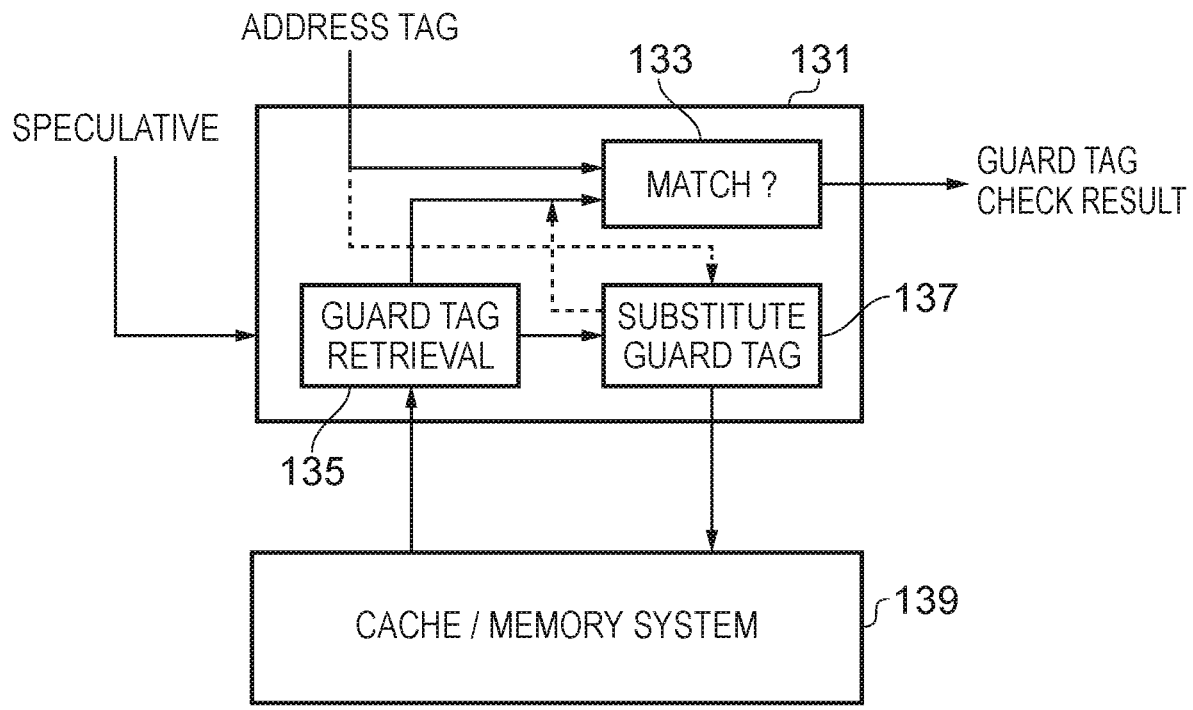
Figure 6B:
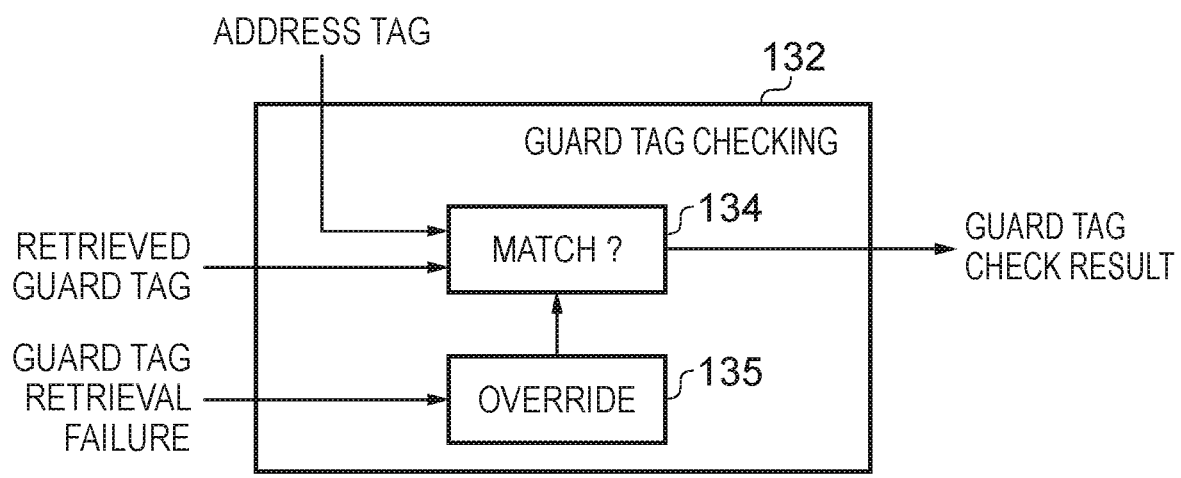
Figure 7A:
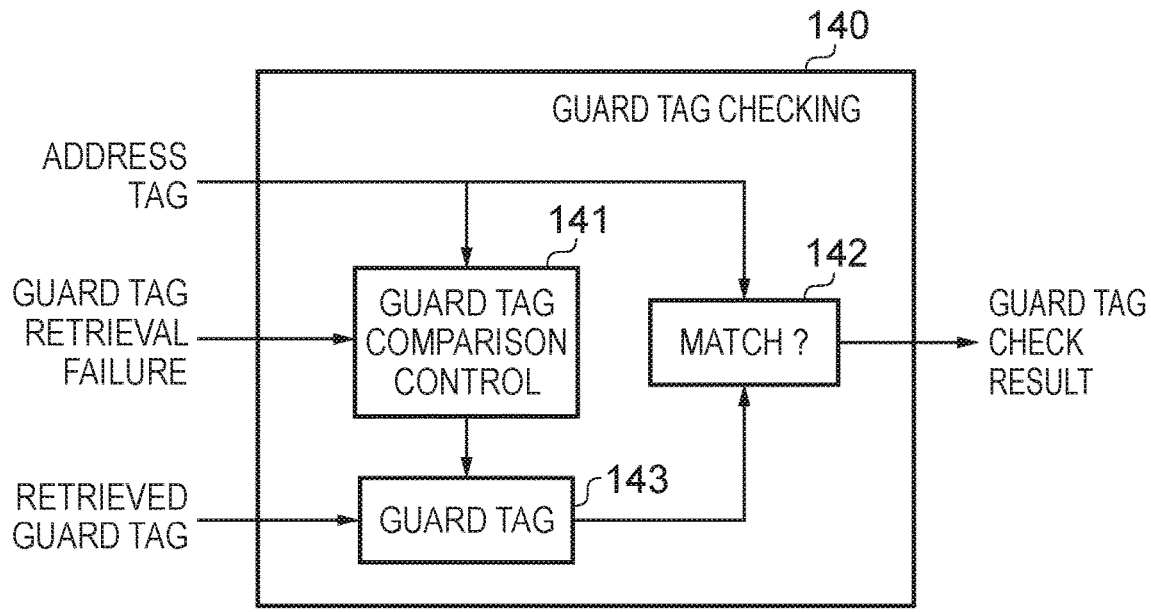
Figure 7B:
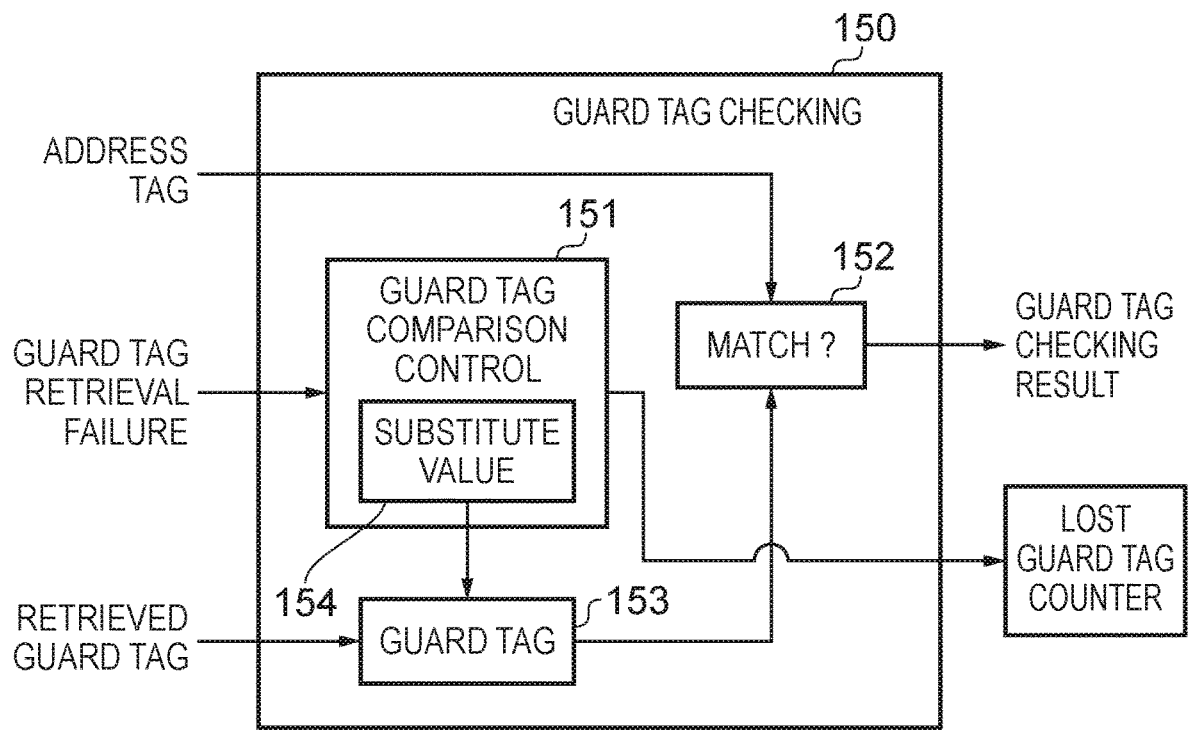
Figure 8A:
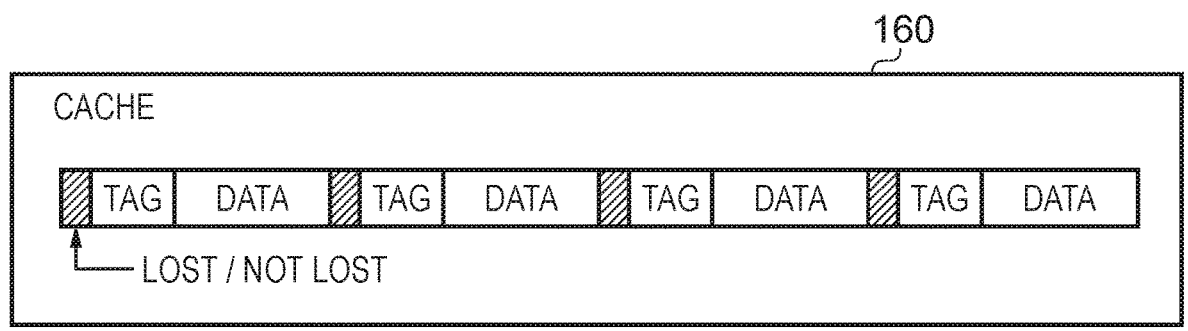
Figure 8B:
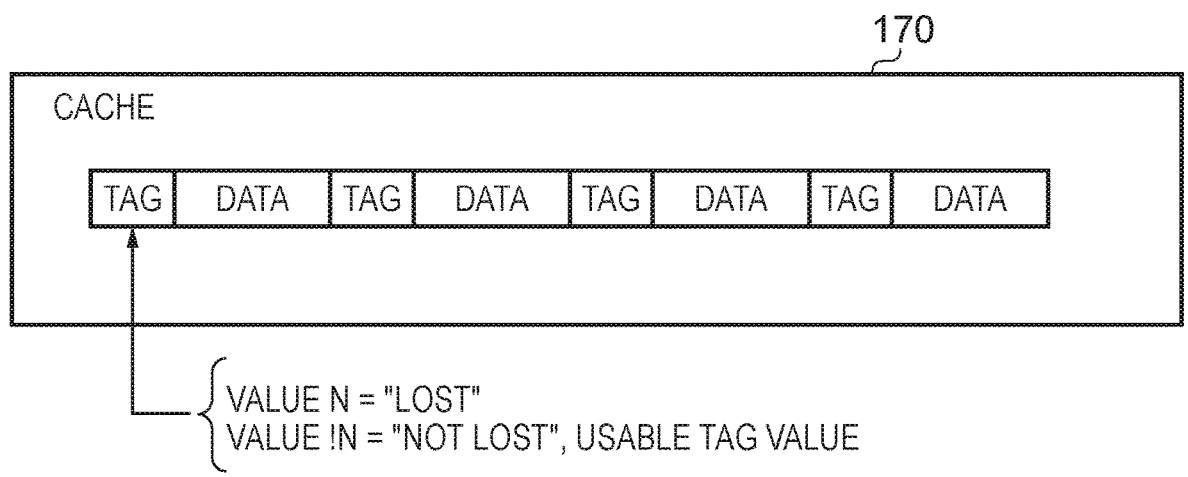
Figure 9:
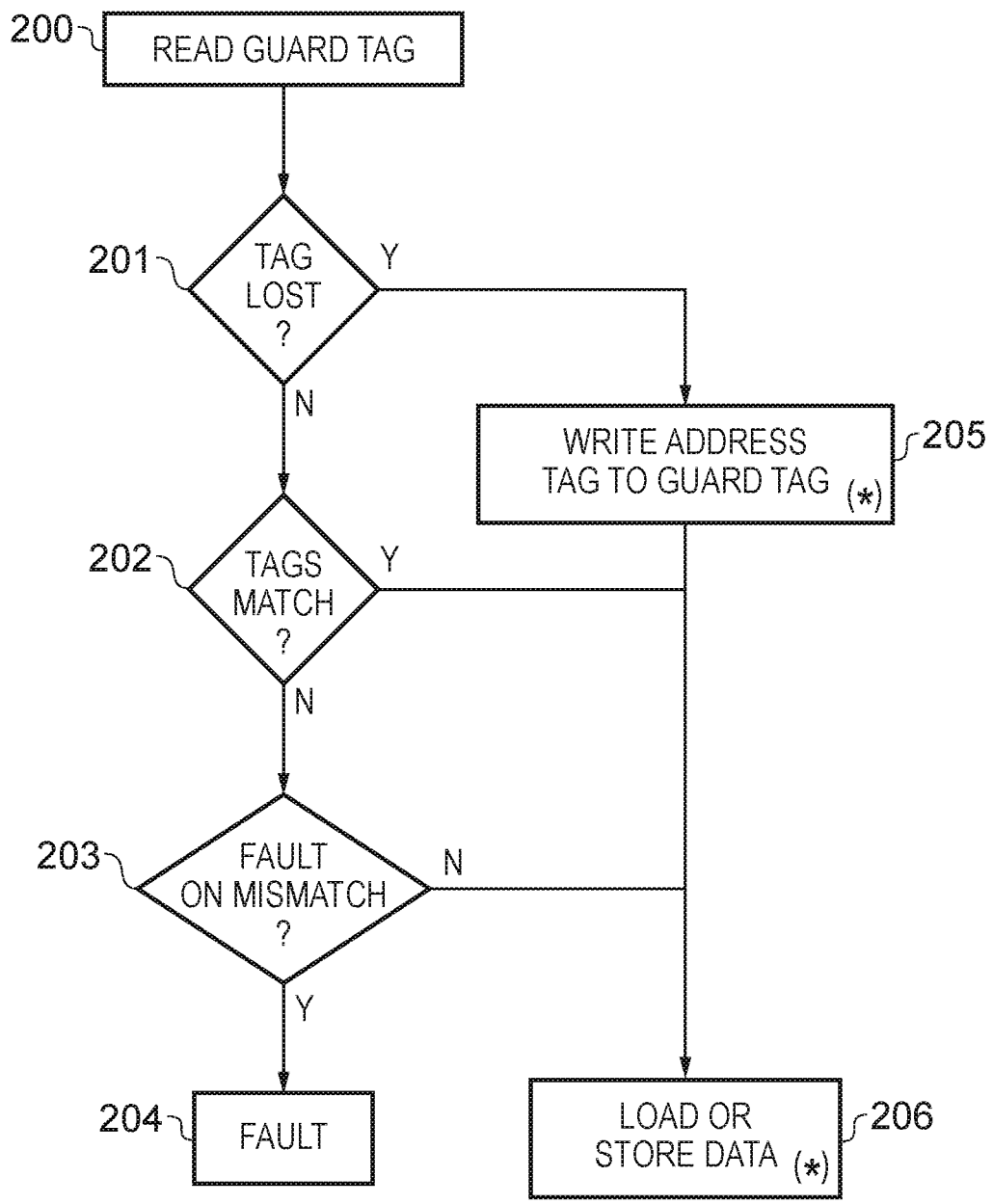
Figure 10A:
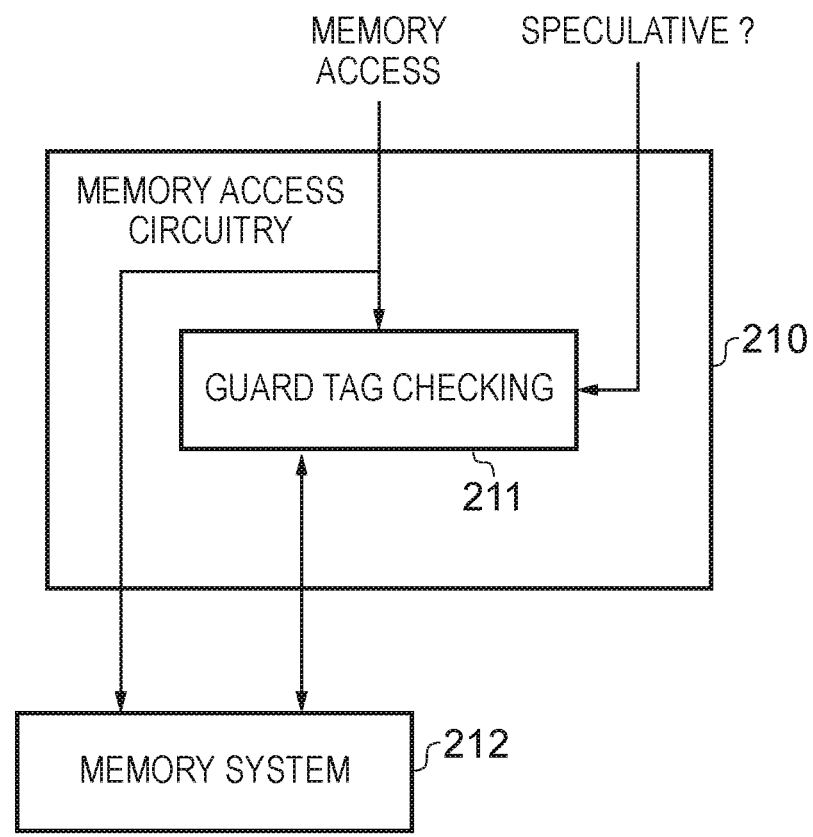
Figure 10B:
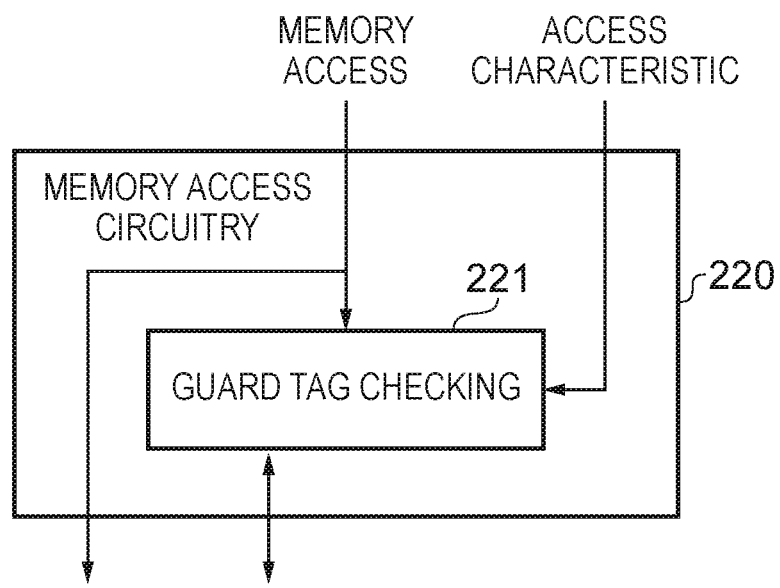
Figure 11:
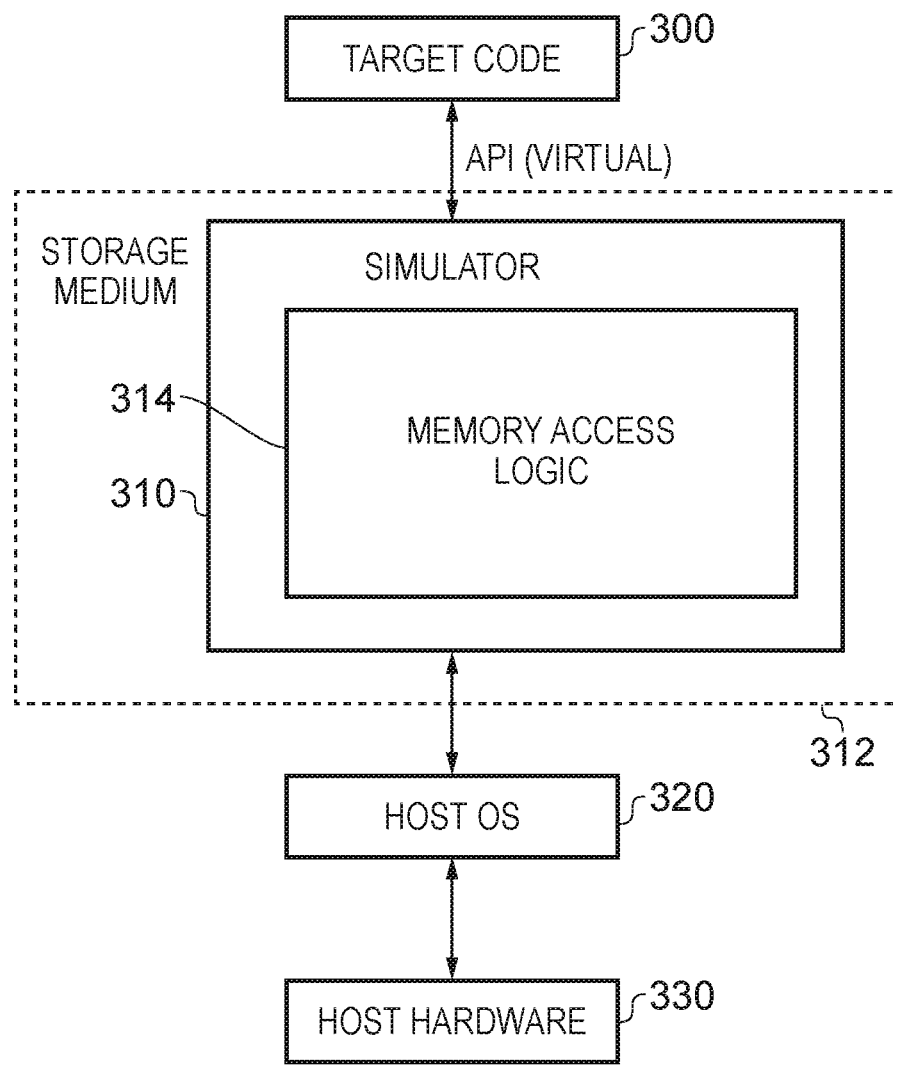

FIG. 4A schematically illustrates a cache line stored in a cache which may be evicted to a further cache level or to memory, and returned to the cache in a fill operation, and FIG. 4B schematically illustrates how a guard tag may be lost by eviction of a cache line;

FIG. 5 schematically illustrates memory access circuitry in one embodiment;

FIG. 6A schematically illustrates guard tag checking circuitry forming part of memory access circuitry in one embodiment;

FIG. 6B schematically illustrates guard tag checking circuitry forming part of memory access circuitry in one embodiment;

FIG. 7A schematically illustrates guard tag checking circuitry forming part of memory access circuitry in one embodiment;

FIG. 7B schematically illustrates guard tag checking circuitry forming part of memory access circuitry in one embodiment;

FIG. 8A schematically illustrates a cache line stored in a cache in which each data item has the capability to store an associated tag and a further flag value indicating whether or not the tag value has been lost;

FIG. 8B schematically illustrates a cache line stored in a cache in which a particular tag value is used to indicate a lost tag value;

FIG. 9 is a flow diagram showing a sequence of steps according to which a guard tag is read and compared against an address tag in one embodiment;

FIG. 10A schematically illustrates memory access circuitry which may modify or suppress guard tag checking for speculative memory accesses;

FIG. 10B shows a variant on FIG. 10A according to which guard tag checking may be suppressed or varied depending on different access characteristics of a memory access; and FIG. 11 shows an example of a simulator supporting memory access logic.

In one example herein there is an apparatus comprising: memory access circuitry to perform a tag-guarded memory access in response to a received target address, the tag-guarded memory access comprising: a guard-tag retrieval operation to retrieve a guard tag stored in association with a block of one or more memory locations comprising an addressed location identified by the received target address; and a guard-tag check operation of comparing an address tag associated with the received target address with the guard tag retrieved by the guard-tag retrieval operation, wherein the memory access circuitry is responsive to the guard-tag retrieval operation being unsuccessful in retrieving the guard tag to cause storage of a substitute guard tag value as the guard tag stored in association with the block of one or more memory locations comprising the addressed location identified by the target address.

In a data processing system which supports tag-guarded memory accesses, memory access circuitry can determine if an address tag associated with a memory access matches a guard tag stored in association with a memory location addressed by the memory access. However the present techniques recognise that there are circumstances in which the availability of a guard tag stored in association with that memory location is not guaranteed. For example in some approaches to supporting tag-guarded memory accesses, guard tags may be generated and stored in association with data in a cache, but not in association with data stored in a persistent memory. This approach may for example be taken for reasons of backwards compatibility, since a memory system may not support the additional storage of guard tags in association with data values, or for reasons of storage economy, where it is determined that the additional storage space required to persistently store guard tags in association with data values is not deemed to be justified. However this then means that in an apparatus which comprises memory access circuitry arranged to perform tag-guarded memory accesses, the availability of a guard tag as part of that tag guarded memory access may vary. The present techniques address this issue by providing memory access circuitry which, when the guard tag is not available (and hence the guard tag retrieval operation is unsuccessful) causes storage of a substitute guard tag value associated with the relevant memory location or memory locations. Storage of a substitute guard tag value may be variously configured, in particular in terms of what that substitute guard tag value is selected to be, and this provides useful flexibility in the system configuration. The choice of a substitute guard tag value also enables the memory access circuitry to then influence how the data value and its associated guard tag are treated in subsequent memory access operations.

The substitute guard tag value may be variously defined, but in some embodiments the substitute guard tag value is selected to match the address tag associated with the received target address in the guard-tag check operation. This therefore means that a subsequent memory access to the same target address using and providing the same address tag will then also match. It should be noted that the definition of a match between an address tag and a guard tag could vary and it may not be necessary for the entirety of the guard tag to match the entirety of the address tag for a match to be determined. However in some embodiments the two may be required to be identical. In the light of this in some embodiments the substitute guard tag value is the address tag associated with the received target address.

This approach of replacing the missing guard tag value with that of the address tag (or at least such that the two will be determined to match) may be adopted on the assumption that most memory accesses are legitimately performed (i.e. the address tag is expected to match the guard tag) and therefore in the majority of cases this approach will essentially "repair" the guard tag with its correct value. Nevertheless even if the memory access which caused the storage of the substitute guard tag value was in fact incorrect (i.e. the address tag provided would not have matched against the correct guard tag value, had it been found), this mismatch can nevertheless be identified at the next access to the same memory location, since that subsequent access providing its own address tag will then not match and this failure of the subsequent tag-guarded memory access can, if required, trigger a re-evaluation of what the guard tag should be and its correction.

Such a determination of what the guard tag value should be may for example be possible by signalling the failure of the tag-guarded memory access to a processor device which can execute software to determine the correct guard tag value. Alternatively it may be the case that a backup of the guard tag value is stored in a secondary location and that may then be accessed in order to determine what the correct value of the guard tag should be, before causing this to be stored as the substitute guard tag value. Accordingly, in some embodiments the memory access circuitry is responsive to the guard-tag retrieval operation being unsuccessful in retrieving the guard tag to initiate a determination of a previously defined value for the guard tag as the substitute guard tag value.

As mentioned above the determination of the previously defined value for the guard tag may be carried out by software and accordingly in some embodiments the memory access circuitry is responsive to the guard-tag retrieval operation being unsuccessful in retrieving the guard tag to cause an exception to be taken by instruction execution circuitry of the apparatus, wherein the instruction execution circuitry is responsive to the exception to execute a guard-tag repair exception routine comprising the determination of the previously defined value for the guard tag.

Where the tag-guarded memory access comprises a guard-tag check operation in which the address tag is compared against the guard tag, mechanisms may be provided to influence the outcome of that comparison in the event that the guard-tag retrieval operation is not successful. In some embodiments the memory access circuitry is responsive to the guard-tag retrieval operation being unsuccessful in retrieving the guard tag to determine a result of the guard-tag check operation to be that a match is established between the address tag associated with the received target address and the guard tag. Thus when the guard tag retrieval operation is unsuccessful and therefore a comparison between the (missing) guard tag and the address tag is not possible, this provides that the memory access circuitry can nonetheless determine that a match has been established between the address tag and the guard tag, such that the subsequent mechanisms in the apparatus which make use of the outcome of the guard-tag checking can continue to operate as though the match was found.

This overriding of the guard-tag check operation may be achieved in various ways, such as an explicit override of the output of the guard tag check operation, but in some embodiments the memory access circuitry is responsive to the guard-tag retrieval operation being unsuccessful in retrieving the guard tag to treat the guard tag as having a predetermined match-all characteristic, such that the match is established between the address tag associated with the received target address and the guard tag. Thus within the range of guard tag values defined, a particular guard tag value may be used to mean "match-all" i.e. that this will be determined to match against any address tag value against which it is compared. This particular guard tag value may be then used as the substitute guard tag value in the event of the unsuccessful guard tag retrieval operation, or else the guard-tag checking may be configured such that the response which it generates for a comparison against match-all is reproduced in the event of the unsuccessful guard tag retrieval operation.

The predetermined match-all characteristic may be a particular value of the guard tag, or may be a additional item of information in association with the guard tag. Accordingly, in some embodiments the predetermined match-all characteristic is a predetermined value of the guard tag, whilst in other embodiments the predetermined match-all characteristic is presence of a set match-all flag associated with the guard tag.

When the guard tag retrieval operation is unsuccessful in retrieving the guard tag this information may be captured in some manner and accordingly in some embodiments the memory access circuitry is responsive to the guard-tag retrieval operation being unsuccessful in retrieving the guard tag to generate a lost-guard-tag indication. This lost-guard-tag indication may then be variously used, either to trigger a particular desired response, or for example to accumulate statistics relating to the loss of guard tags.

Hence in some embodiments the memory access circuitry is arranged to store the lost-guard-tag indication in association with the received target address. Thus the target of the memory access may be explicitly labelled as having lost its guard tag.

In some embodiments the memory access circuitry is arranged to signal the lost-guard-tag indication to a processor unit. The processor unit may then respond or monitor in an appropriate manner.

In some embodiments the memory access circuitry is responsive to the guard-tag retrieval operation being unsuccessful in retrieving the guard tag to increment a lost-guard-tag counter. Such a loss guard tag counter can therefore accumulate statistics for how often guard tags are lost. This lost guard tag counter may be provided in a variety of locations in the system as appropriate, whether within the memory access circuitry itself or elsewhere.

The present techniques recognise that carrying out a tag-guarded memory access may not be appropriate for all memory accesses which the memory access circuitry may receive and accordingly in some embodiments the memory access circuitry is responsive to a characteristic of a memory access which provides the received target address to selectively perform one of: the tag-guarded memory access; and a non-tag-guarded memory access.

The characteristic which causes either a tag guarded or a non tag guarded memory access to be carried out may be variously defined, but in some embodiments the characteristic of the memory access comprises at least one of: a type of a requester which generated the memory access; a privilege level of the requester which generated the memory access; and the received target address.

In some embodiments the characteristic of the memory access comprises an indication that the memory access forms part of speculative data processing and the memory access circuitry is responsive to the indication that the memory access forms part of speculative data processing to perform the non-tag-guarded memory access. For example it may be determined that the tag-guarded memory access of the present techniques and its ability to modify guard tag values with substitute guard tag values may not be appropriate in the context of speculative data processing.

This conservative approach to the response of the memory access circuitry to memory accesses triggered by speculative data processing may be more specific within the memory access circuitry itself, in that a tag guarded memory access is allowed to proceed even if the memory access forms part of the speculative data processing, but no modification of the guard tag values is allowed and accordingly in some embodiments the memory access circuitry is responsive to an indication that the memory access forms part of speculative data processing to prevent storage of the substitute guard tag value as the guard tag stored in association with the block of one or more memory locations comprising the addressed location identified by the target address.

In some examples there is a method comprising: performing a tag-guarded memory access in response to a received target address, the tag-guarded memory access comprising the steps of: retrieving a guard tag stored in association with a block of one or more memory locations comprising an addressed location identified by the received target address; and comparing an address tag associated with the received target address with the guard tag retrieved in the retrieving step, and, when the retrieving step is unsuccessful in retrieving the guard tag, causing storage of a substitute guard tag value as the guard tag stored in association with the block of one or more memory locations comprising the addressed location identified by the target address.

In some examples there is a computer program for controlling a host data processing apparatus to provide an instruction execution environment for execution of instructions of target program code, comprising: memory access logic to perform a tag-guarded memory access in response to a received target address, the tag-guarded memory access comprising: a guard-tag retrieval operation to retrieve a guard tag stored in association with a block of one or more memory locations comprising an addressed location identified by the received target address; and a guard-tag check operation of comparing an address tag associated with the received target address with the guard tag retrieved by the guard-tag retrieval operation, wherein the memory access logic is responsive to the guard-tag retrieval operation being unsuccessful in retrieving the guard tag to cause storage of a substitute guard tag value as the guard tag stored in association with the block of one or more memory locations comprising the addressed location identified by the target address.

In some embodiments there is a storage medium storing the computer program described above, wherein this storage medium may be a non-transitory storage medium.

Some particular embodiments are now described with reference to the figures.

Figure 1:
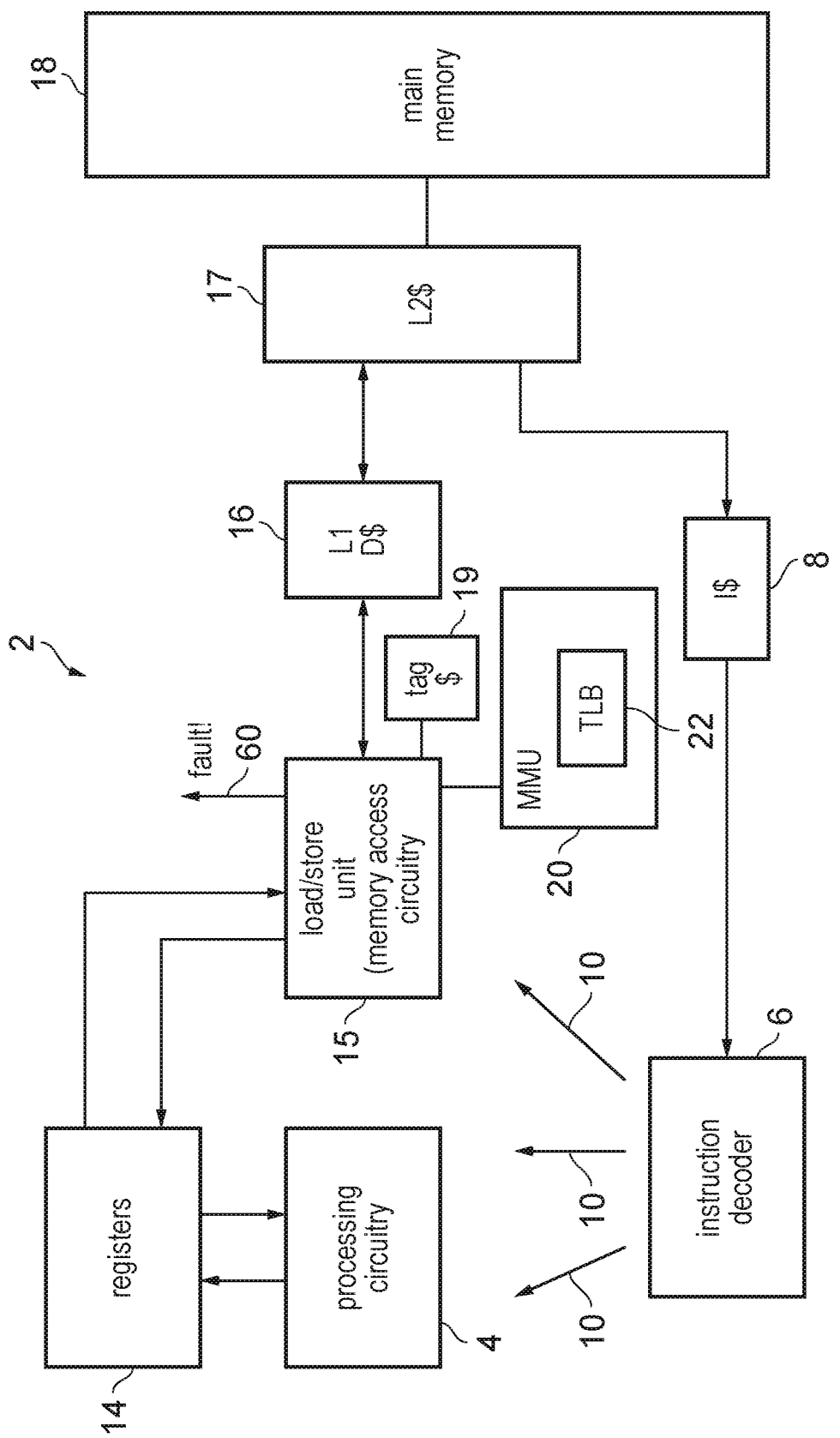

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes memory access circuitry (e.g. including a load/store unit) 15 for controlling transfer of data between the registers 14 and the memory system. In this example, the memory system includes the instruction cache 8, a level 1 (L1) data cache 16, a level 2 (L2) cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page tables stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
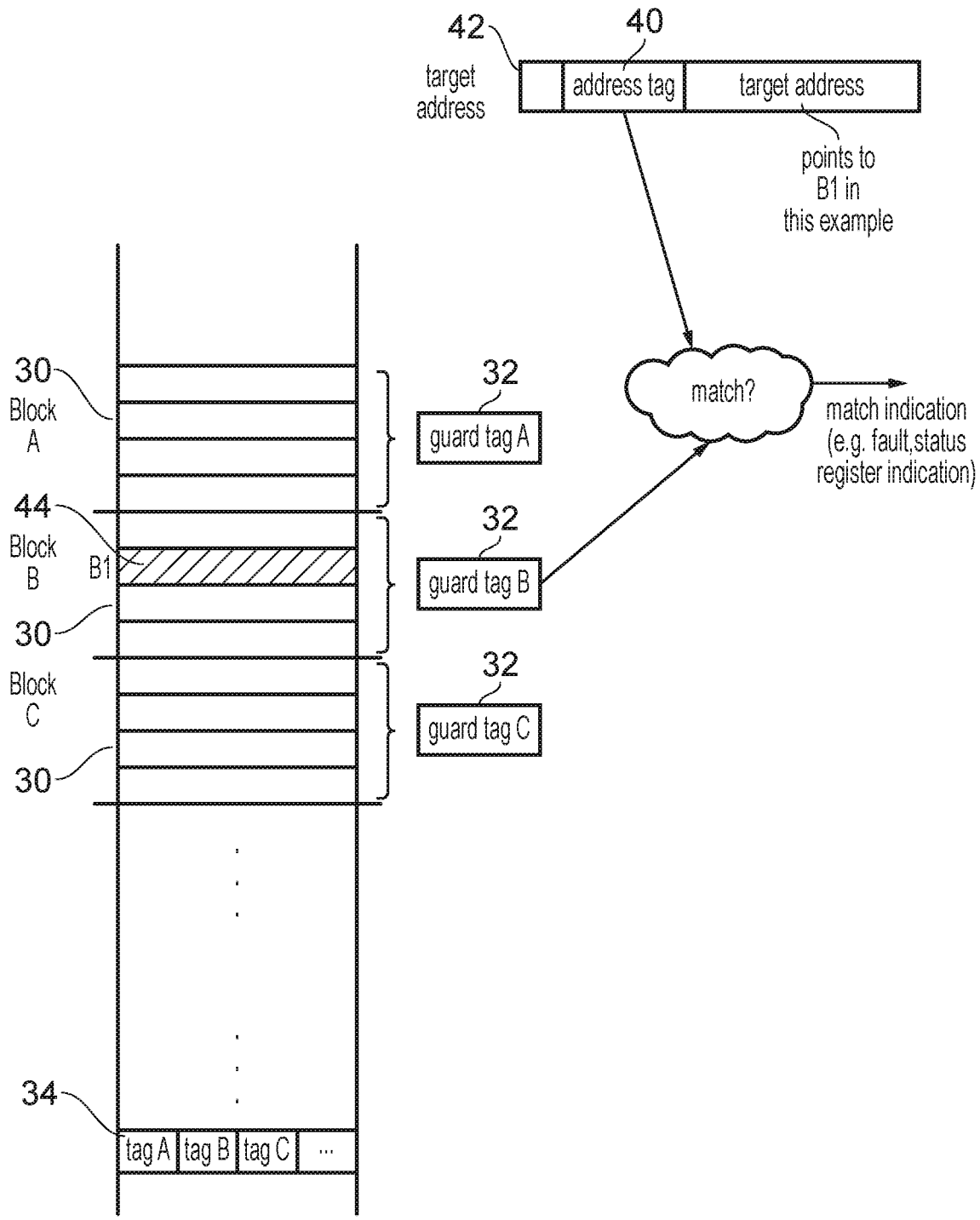
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18, which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro-architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro-architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), can be compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 40 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler, for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, a comparison is made between the address tag 40 and the guard tag 32 associated with a block 30 including the addressed location 44, and a determination as to whether they match. It should be noted that in the example configuration of FIG. 1 the comparison could be performed anywhere between the load/store unit 15 and the physical memory 18 (and indeed could be distributed along that path). However in this example, the comparison is described for simplicity in terms of it being carried out by the load/store unit 15. The load/store unit 15 generates a match indication indicating whether the address tag 40 and the guard tag 32 matched. For example, this match indication could be a fault signal 60, which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
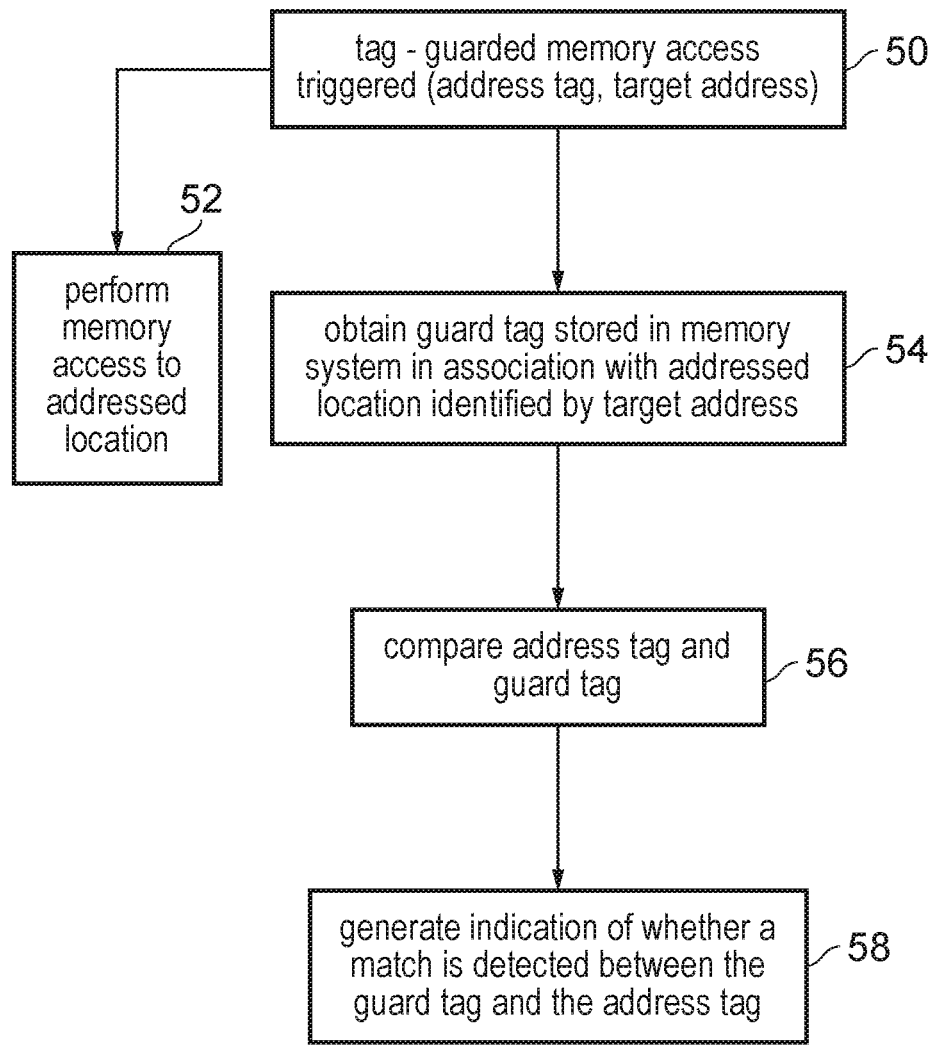
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory accesses is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

FIG. 4A schematically illustrates a cache 100 and a further cache or memory 105. A cache line 102 in the cache 100 is shown which may be evicted to the further cache or memory 105 and, when the data in the cache line is required again, a fill from the further cache or memory 105 may cause the cache line 102 to be allocated in the cache 100 again. The cache line 102 is shown to comprise data 105 and an associated guard tag 103. Note that this individual cache line 102 in fact comprises four items of data and associated guard tags. These are also present in the equivalent data 108 (which in the event that 105 is a further cache is also a further cache line). The illustration of FIG. 4A is to be compared with that of FIG. 4B, which represents a different cache 110 and a different further cache or memory 112. The content of the cache 110 is the same as in FIG. 4A, namely the cache line 102 comprising guard tag 103 and data 104. However, as shown in FIG. 4B the eviction of this cache line 102 causes the loss of the guard tag 103 and indeed of all guard tags from this cache line 102 since the further cache or memory 112 is not configured to store guard tags. Hence the equivalent data item 114 only comprises the same data item 104 and three further data items (not populated in this illustration of FIG. 4B). Accordingly, when this data 104 is required again for a memory access and is promoted to the cache 110 in a fill operation, the guard tag 103 which was previously present is then lost and the cache line 102 will be present in the cache 110 without guard tag 103.

FIG. 5 schematically illustrates memory access circuitry 120 which is arranged to perform tag-guarded memory accesses in response to received target addresses. The memory access circuitry 120 comprises data access circuitry 122, guard tag retrieval circuitry 124 and guard tag checking circuitry 126. When memory access circuitry 120 receives a target address as part of a memory access, the target address causes the data access circuitry 122 and guard tag retrieval circuitry 124 to seek to access the relevant data value and guard tag in the cache/memory system 130. It should be noted that for clarity of discussion data access circuitry 122 and guard tag retrieval circuitry 124 are represented separately in the illustration of FIG. 5, but as the discussion of FIG. 4A and FIG. 4B has illustrated, access to a given data value and guard tag may in fact, say, comprise access to a single cache line in a given cache. Moreover, the illustration of FIG. 5 allows for the fact that the data value and guard tag value may not be stored as closely associated with one another as in the example of FIG. 4A (within a single cache line), but may also be stored in entirely separate physical locations. Nevertheless however the guard tag and data value are stored the guard tag retrieval operation circuitry accesses the cache/memory system 130 and a response is received by the guard tag checking circuitry 126. When the guard tag is successfully retrieved this is compared against the received address tag and a guard tag check result is generated. This may be used in various ways such as signalled to a processor (which may or may not have been the source of the memory access). The data may also be returned from the cache/memory system 130 in the event that the memory access is a load.

FIG. 6A schematically illustrates an example embodiment of guard tag checking circuitry 131. Here the guard tag checking circuitry 131 comprises comparison circuitry 134, guard tag retrieval circuitry 135, and substitute guard tag storage 137. The comparison circuitry 133 is arranged to determine whether a retrieved guard tag and an address tag match and to generate a guard tag check result. It should be noted that a match between the address tag and the retrieved guard tag may require that the two are identical or in some implementations there may for example be some bits of a multi bit value which form part of either or both of the address tag and the guard tag, but are not required to match. A guard tag retrieved from cache/memory system 139 by the guard tag retrieval circuitry 135 is passed to the comparison circuitry 133 to determine whether the retrieved guard tag and the address tag match. In the event that the guard tag retrieval fails, the guard tag retrieval circuitry 135 signals this to the substitute guard tag storage 137. In response, the guard tag checking circuitry 131 causes a substitute guard tag to be stored in the cache/memory system 139 in association with the relevant memory address (or addresses). It should be noted that the substitute guard tag value may be a predetermined value (for example which is used whenever any guard tag value is found to be "lost"). In some examples this predetermined value may be a "match_all" value, which is used in the guard tag checking to indicate a value against which any received address tag will be found to match.

However in some examples the guard tag checking circuitry 131 is arranged to use (as shown by a dashed line in FIG. 6A) the address tag received (and against which the guard tag should be compared) as the substitute guard tag. Accordingly in this arrangement, when the guard tag retrieval fails (i.e. when the guard tag value is "lost"), the guard tag checking circuitry 131 causes the address tag of the memory access to be stored in the cache/memory system 139 in association with the relevant memory address (or addresses). Further, in such an arrangement (as also shown by a dashed line in FIG. 6A), the substitute guard tag may also be provided to the comparison circuitry 133 at its guard tag input. This therefore provides that the address tag received as part of the memory access is compared against either the predetermined substitute value or the address tag itself. The predetermined substitute value and the comparison circuitry 133 can be set up such that a particular output for the guard tag check result is obtained (e.g. to force a "match" output, to instead generate a "guard tag lost" output, and so on). Finally, note however that the guard tag checking circuitry 131 also receives an indication of whether the memory access is speculative or not. The guard tag checking circuitry 131 may be arranged to respond in a variety of ways to an indication that the memory access is speculative, but one particular configuration envisaged is that when the memory access is speculative the guard tag checking circuitry 131 prevents the storage of the substitute guard tag value in the cache/memory system 139.

FIG. 6B schematically illustrates one example embodiment of some elements of the guard tag checking circuitry. Here the guard tag checking circuitry 132 comprises comparison circuitry 134 and override circuitry 135. The comparison circuitry 134 is arranged to determine whether a retrieved guard tag and an address tag match and to generate a guard tag check result. It should be noted that a match between the address tag and the retrieved guard tag may require that the two are identical or in some implementations there may for example be some bits of a multi bit value which form part of either or both of the address tag and the guard tag, but are not required to match. The override circuitry 135 receives the signal that the guard tag retrieval has failed. This may be an explicit signal from the cache/memory system from the guard tag retrieval was attempted or may for example be an indication that, where a guard tag value temporarily held within the memory access circuitry was expected as a result of the guard tag retrieval, none is found, or may indeed be an explicit value indicating the loss of a guard tag. However this is determined, the override circuitry 135 provides a signal to the comparison circuitry 134 in the event of guard tag retrieval failure and this causes the comparison circuitry 134 to generate the guard tag check result as though the address tag and retrieved guard tag did match.

FIG. 7A schematically illustrates a variant of some elements of the guard tag checking circuitry in which the guard tag checking circuitry 140 comprises guard tag comparison control 141, comparison circuitry 142 and guard tag storage circuitry 143. When a guard tag is successfully retrieved it is stored temporarily in the guard tag storage 143 and the comparison circuitry 142 then compares this against the received address tag to generate the guard tag check result.

However in the event that there is a guard tag retrieval failure this information is received by the guard tag comparison control 142 which then causes the address tag received to be stored in the guard tag storage 143. Thus when the comparison circuitry 142 performs its comparison it is comparing the address tag with itself and the guard tag check result indicates that a match was found.

FIG. 7B schematically illustrates a variant of some elements of the guard tag checking circuitry. Here the guard tag checking circuitry 150 comprises guard tag comparison control 151, comparison circuitry 152, guard tag storage 153 and, within the guard tag comparison control 152, a substitute value storage 154. When a guard tag is successfully retrieved and temporarily stored in guard tag storage 153 this is compared against the received address tag by the comparison circuitry 152 and the guard tag checking result is generated. However in the event of guard tag retrieval failure the guard tag comparison control causes the substitute value 154 to be used in place of a retrieved guard tag and places this value in the guard tag storage 153. Thus in the event of guard tag retrieval failure the comparison circuitry 152 compares the received address tag with the substitute value 154. This substitute value 154 may be variously configured, for example being a predefined "match_all" value which the comparison circuitry 152 is configured to positively match against any address tag received.

FIG. 8A schematically illustrates a cache 160 in an embodiment in which the cache line is further extended to not only include the relevant data value and their associated guard tags, but further an additional bit is provided in association with each guard tag by means of which it can be indicated that the guard tag has been lost. These additional bits are illustrated by the hatched blocks in FIG. 7A. Thus when a guard tag is lost an indication of this can be maintained in association with this data value in order to handle it differently in terms of the guard tag checking in the future. For example when a data value is accessed which has this lost guard tag flag set, the guard tag checking may be over-ridden.

FIG. 8B illustrates a variant in which a cache 170 is shown to comprise a cache line in which data values are stored with associated guard tags, where a particular value N of the guard tag is used to indicate a lost tag, whereas any other value (!N) indicates that this guard tag has not been lost but rather this is a usual and useable tag value.

FIG. 9 is a flow diagram showing a sequence of steps which are taken in one method embodiment. At step 200 a guard tag is read and at step 201 it is determined if the guard tag has been lost (i.e. if the guard tag could not be read). If this is not the case, and the guard tag has been successfully read, then at step 202 it is determined if the tags match, i.e. if the read guard tag matches the address tag of the memory access which triggered this guard tag checking. If the tags do match, then the flow proceeds to step 206, where the memory access is carried out (thus either loading or storing data, depending on the nature of the memory access). If the tags do not match then at step 203 it is checked if a fault should be generated for such a mismatch. This not being the case, the flow also proceeds to step 206. If a fault should be generated in response to the mismatch, this happens at step 204. Returning to a consideration of step 201, if it is found that the tag has been lost then the flow proceeds to step 205, where the address tag (of the memory access) is written to the guard tag. Hence the lost guard tag is substituted for by the address tag. the flow then continues to step 206 for the memory access to be carried out (load or store). It should further be noted, as highlighted by the (*) in each of steps 205 and 206, that the order of these steps may be the inverse of that illustrated. In other words, the memory access may be carried out before the address tag is written as the substitute guard tag. There may however in some systems be constraints on how late the tag write can appear to happen.

FIG. 10A schematically illustrates memory access circuitry 201 in an example embodiment in which the guard tag checking circuitry 211 which forms part of the memory access circuitry receives an indication of whether the memory access is speculative, as well as the memory access itself. The guard tag checking circuitry 211 is responsive to an indication that the memory access is speculative to suppress its operation for the memory access, such that a non-guard-tag-checked memory access to the memory system 212 occurs. More generally, FIG. 10B schematically illustrates memory access circuitry 220 in an example embodiment in which the guard tag checking circuitry 221 which forms part of the memory access circuitry receives an access characteristic of the memory access, as well as the memory access itself. The access characteristic can, for example, be an indication of a type of a requester which generated the memory access, a privilege level of the requester which generated the memory access, an indication of the received target address, and so on. The guard tag checking circuitry 221 is responsive to the access characteristic, in dependence on the particular type of access characteristic and the configuration of the guard tag checking circuitry 221, to suppress its operation for the memory access, such that a non-guard-tag-checked memory access occurs. Thus guard tag checking, and in particular the techniques for responding to the loss of guard tags disclosed herein, can be enabled only for certain types of memory access or sources of memory access.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium 312 (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300 may be executed from within the instruction execution environment using the simulator program 310, so that a host computer 330 which does not actually have the hardware features of the apparatus 2 discussed above, and in particular the memory access circuitry 120, can emulate these features. For example, the simulator program 310 may include memory access logic 314 for simulating the described memory accesses. Thus the simulator program 310 can also include memory access program logic for performing the comparison of a guard tag and an address tag, reporting whether any mismatch between the guard tag and the address tag has been detected, and storing a substitute guard tag when a guard-tag retrieval operation is unsuccessful.

In brief overall summary, an apparatus comprising memory access circuitry to perform a tag-guarded memory access in response to a received target address and methods of operation of the same are disclosed. In the tag-guarded memory access a guard-tag retrieval operation seeks to retrieve a guard tag stored in association with a block of one or more memory locations comprising an addressed location identified by the received target address, and a guard-tag check operation compares an address tag associated with the received target address with the guard tag retrieved by the guard-tag retrieval operation. When the guard-tag retrieval operation is unsuccessful in retrieving the guard tag, a substitute guard tag value is stored as the guard tag in association with the block of one or more memory locations comprising the addressed location identified by the target address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
memory access circuitry to perform a tag-guarded memory access in response to a received target address, the tag-guarded memory access comprising:
a guard-tag retrieval operation to retrieve a guard tag stored in association with a block of one or more memory locations comprising an addressed location identified by the received target address; and
a guard-tag check operation of comparing an address tag associated with the received target address with the guard tag retrieved by the guard-tag retrieval operation,
wherein the memory access circuitry is responsive to the guard-tag retrieval operation being unsuccessful in retrieving the guard tag to cause storage of a substitute guard tag value as the guard tag stored in association with the block of one or more memory locations comprising the addressed location identified by the target address.

2. The apparatus as claimed in claim 1, wherein the substitute guard tag value is selected to match the address tag associated with the received target address in the guard-tag check operation.

3. The apparatus as claimed in claim 1, wherein the substitute guard tag value is the address tag associated with the received target address.

4. The apparatus as claimed in claim 1, wherein the memory access circuitry is responsive to the guard-tag retrieval operation being unsuccessful in retrieving the guard tag to initiate a determination of a previously defined value for the guard tag as the substitute guard tag value.

5. The apparatus as claimed in claim 4, wherein the memory access circuitry is responsive to the guard-tag retrieval operation being unsuccessful in retrieving the guard tag to cause an exception to be taken by instruction execution circuitry of the apparatus,
wherein the instruction execution circuitry is responsive to the exception to execute a guard-tag repair exception routine comprising the determination of the previously defined value for the guard tag.

6. The apparatus as claimed in claim 1, wherein the memory access circuitry is responsive to the guard-tag retrieval operation being unsuccessful in retrieving the guard tag to determine a result of the guard-tag check operation to be that a match is established between the address tag associated with the received target address and the guard tag.

7. The apparatus as claimed in claim 6, wherein the memory access circuitry is responsive to the guard-tag retrieval operation being unsuccessful in retrieving the guard tag to treat the guard tag as having a predetermined match-all characteristic, such that the match is established between the address tag associated with the received target address and the guard tag.

8. The apparatus as claimed in claim 7, wherein the predetermined match-all characteristic is a predetermined value of the guard tag.

9. The apparatus as claimed in claim 7, wherein the predetermined match-all characteristic is presence of a set match-all flag associated with the guard tag.

10. The apparatus as claimed in claim 1, wherein the memory access circuitry is responsive to the guard-tag retrieval operation being unsuccessful in retrieving the guard tag to generate a lost-guard-tag indication.

11. The apparatus as claimed in claim 10, wherein the memory access circuitry is arranged to store the lost-guard-tag indication in association with the received target address.

12. The apparatus as claimed in claim 10, wherein the memory access circuitry is arranged to signal the lost-guard-tag indication to a processor unit.

13. The apparatus as claimed in claim 1, wherein the memory access circuitry is responsive to the guard-tag retrieval operation being unsuccessful in retrieving the guard tag to increment a lost-guard-tag counter.

14. The apparatus as claimed in claim 1, wherein the memory access circuitry is responsive to a characteristic of a memory access which provides the received target address to selectively perform one of:
the tag-guarded memory access; and
a non-tag-guarded memory access.

15. The apparatus as claimed in claim 14, wherein the characteristic of the memory access comprises at least one of:
a type of a requester which generated the memory access;
a privilege level of the requester which generated the memory access; and
the received target address.

16. The apparatus as claimed in claim 14, wherein the characteristic of the memory access comprises an indication that the memory access forms part of speculative data processing and the memory access circuitry is responsive to the indication that the memory access forms part of speculative data processing to perform the non-tag-guarded memory access.

17. The apparatus as claimed in claim 1, wherein the memory access circuitry is responsive to an indication that the memory access forms part of speculative data processing to prevent storage of the substitute guard tag value as the guard tag stored in association with the block of one or more memory locations comprising the addressed location identified by the target address.

18. A method comprising:
performing a tag-guarded memory access in response to a received target address, the tag-guarded memory access comprising the steps of:
retrieving a guard tag stored in association with a block of one or more memory locations comprising an addressed location identified by the received target address; and
comparing an address tag associated with the received target address with the guard tag retrieved in the retrieving step,
and, when the retrieving step is unsuccessful in retrieving the guard tag, causing storage of a substitute guard tag value as the guard tag stored in association with the block of one or more memory locations comprising the addressed location identified by the target address.

19. A non-transitory storage medium storing a computer program for controlling a host data processing apparatus to provide an instruction execution environment for execution of instructions of target program code, comprising:
memory access logic to perform a tag-guarded memory access in response to a received target address, the tag-guarded memory access comprising:
a guard-tag retrieval operation to retrieve a guard tag stored in association with a block of one or more memory locations comprising an addressed location identified by the received target address; and
a guard-tag check operation of comparing an address tag associated with the received target address with the guard tag retrieved by the guard-tag retrieval operation,
wherein the memory access logic is responsive to the guard-tag retrieval operation being unsuccessful in retrieving the guard tag to cause storage of a substitute guard tag value as the guard tag stored in association with the block of one or more memory locations comprising the addressed location identified by the target address.

\* \* \* \* \*